June 3, 1941. H. E. PALMETER 2,244,568
TELESCOPE FOR ENDOSCOPIC INSTRUMENTS AND THE LIKE
Filed July 13, 1939
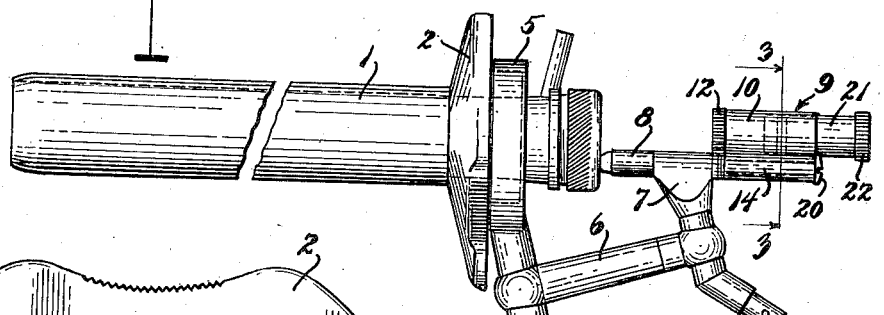
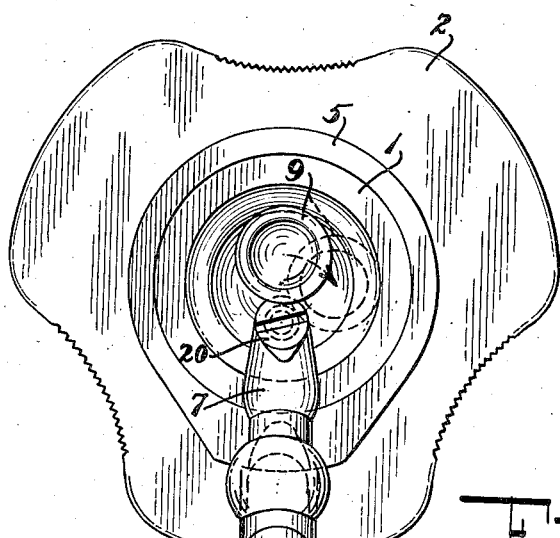
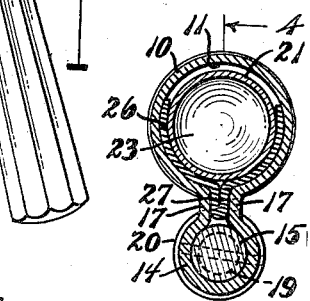
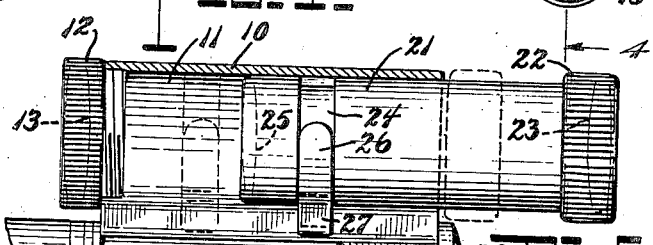
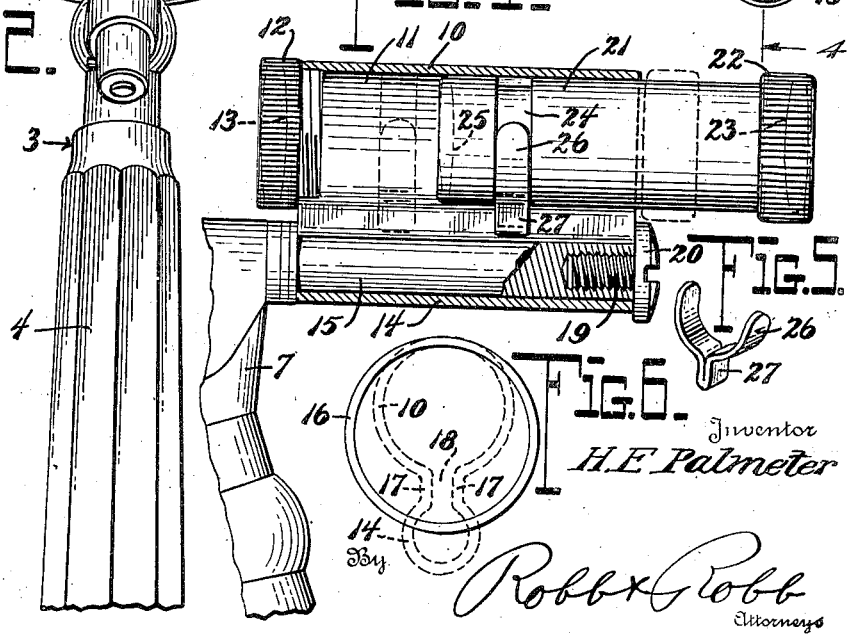
Inventor
H. E. Palmeter
By Robb & Robb
Attorneys Patented June 3, 1941

2,244,568

UNITED STATES PATENT OFFICE 2,244,568

TELESCOPE FOR ENDOSCOPIC INSTRUMENTS AND THE LIKE

Harry E. Palmeter, Auburn, N. Y., assignor to William N. Allyn, Skaneateles, N. Y.

Application July 13, 1939, Serial No. 284,339

8 Claims. (Cl. 88—32)

This invention appertains to optical systems, and more especially, to an improved telescope which is primarily intended for use with endoscopic instruments, and the like.

One of the primary objects of the invention is to provide a simple yet compact and rugged telescope construction which is adapted to be detachably mounted upon a suitable support which is to be applied to the usual barrel of the endoscopic instrument, with the further provision for permitting pivotal adjustment of the telescope about an axis generally coextensive with the central axis of the barrel aforesaid.

Another object of the invention is to provide a novel telescope assembly including an outer and inner sleeve having a telescopic fit one within another so as to permit relative axial displacement of the sleeves as required to focus the telescope, the outer sleeve being so formed as to provide an elongated socket at one side thereof for receiving a support of pin-like form on which the telescope may be rotated.

Still another object of the invention is to provide a pair of telescopic sleeves having relative axial movement, together with means for limiting axial displacement of one sleeve relative to the other, while at the same time yieldably restraining the relatively movable sleeve against axial displacement in its various positions of focal adjustment.

Other objects and advantages of the invention will be hereinafter described, and the novel features thereof defined in the appended claims.

In the drawing—

Figure 1 is a view in side elevation of an endoscopic instrument equipped with my improved telescope;

Figure 2 is an enlarged view of the instrument shown in Figure 1, in end elevation, as seen from the proximal end thereof;

Figure 3 is an enlarged transverse sectional view, taken approximately on the plane of the line 3—3 of Figure 1;

Figure 4 is an enlarged fragmentary detail longitudinal sectional view, taken approximately on the plane of the line 4—4 of Figure 3;

Figure 5 is a perspective view of the yieldable restraining means and stop with which the telescope is provided to limit the relative displacement of the telescopically fitting sleeves and to yieldably restrain said sleeves against axial displacement; and Figure 6 is a detail view illustrating the manner of forming the outer telescope sleeve or barrel and its mounting socket from a normally cylindrical tube.

Like reference characters designate corresponding parts in the several figures of the drawing, in which 1 generally denotes the barrel of an endoscopic instrument such as is customarily employed in rectoscopes, proctoscopes, sigmoidoscopes, and the like. The barrel 1 is axially open from end to end and is provided with an annular flange or collar 2 at its proximal end. Detachably connected to the proximal end of the barrel 1, is a support, generally designated 3, said support including a handle 4 which is provided at its upper extremity with an annular ring or collar 5 for embracing the proximal end of the barrel 1 which is extended for a short distance beyond the annular flange 2. The construction of the support 3 preferably conforms to that disclosed in my copending application filed of even date herewith, but it is to be understood that the same may be modified as desired. Extending rearwardly from the handle 4 of the support 3 is an auxiliary supporting arm 6 upon the free end of which is mounted a head 7 which preferably serves as a common support for the lamp 8 of an illuminating system and the telescope, generally designated 9. The head 7 is preferably pivotally connected to the auxiliary supporting arm 6 so as to be shiftable from its normally upright position as shown in Figure 1, with the lamp 8 and telescope 9 generally aligned with the proximal end of the barrel 1, to an out-of-the-way position at one side or the other of the barrel 1. The construction of the head 7 and its pivotal connection to the auxiliary supporting arm 6 forms no part of the present invention, and has been illustrated only generally herein to show the cooperative relationship of the instrument assembly as a whole. For the details of construction of the head 7 and its connection to the auxiliary supporting arm 6, reference may be had to the copending application of William G. Allyn, filed of even date herewith.

Passing now to the construction of the telescope 9 which forms the subject matter of the present invention, and having particular reference to Figures 3 to 6, inclusive, 10 denotes an outer sleeve or barrel 1 which defines a circular axially elongated chamber 11 having a cap 12 suitably secured to one end thereof for holding a lens 13 across the forward or distal end of the chamber 11. Disposed parallel to the sleeve 10 at one side thereof, is an auxiliary sleeve 14 which defines a socket for the reception of a pin-like support 15 extending rearwardly from the head 7. The sleeves 10 and 14 are preferably constructed integral with each other, and may be formed from a suitable length of cylindrical tubing 16 by pressing the walls of the tubing 16 inwardly towards each other from opposite sides to shape the same into a pair of parallel sleeves which have been designated 10 and 14, respectively, as clearly shown in Figure 6. The sleeve 10 is somewhat larger than the auxiliary sleeve 14, and remains joined to the latter by spaced substantially parallel walls 17, 17 defining an elongated slot 18 therebetween which extends the full length of the sleeves. The internal diameter of the auxiliary sleeve 14 is equal to or slightly greater than the diameter of the pin 15, so that when the sleeve 14 is slipped onto the pin 15, it is free to rotate about the axis of the pin, thereby enabling the sleeve 10 to be adjusted pivotally about the supporting pin 15, as shown by the arrow in Figure 2. The free extremity of the supporting pin 15 is provided with an axial threaded bore to receive a screw 19, the head 20 of which is somewhat larger than the pin 15 and sleeve 14 so that the head will project at least partially across the slot 18 towards the sleeve 10 at the proximal or rear end of the latter, the purpose of which will hereinafter more fully appear.

Telescopically fitting within the sleeve 10 and axially movable therein, is an inner sleeve or barrel 21 having its rear or proximal end provided with a cap 22 for securing a lens 23 across the open end of this sleeve. By suitable telescopic or axial adjustment of the sleeves 10 and 21 relative to each other, the lenses 13 and 23 may be focused in an obvious manner. In the application of the telescope to an endoscopic instrument as herein disclosed, the observer sights through the telescope and focuses the same to clearly observe the internal organs at the distal end of the barrel 1, after the barrel 1 has been inserted into the body, the observation being aided by the illumination afforded by the lamp 8. By suitably adjusting the telescope assembly pivotally on the supporting pin 15, the full area of the organ at the distal end of the barrel 1 may be clearly and minutely examined.

Provision is preferably made for limiting outward displacement of the inner sleeve 21 of the telescope, and also for yieldably restraining this sleeve against axial movement relative to the outer sleeve 10. To this end, the inner sleeve 21 is provided with an annular groove 24 adjacent to its inner or distal end which is preferably closed by a lens 25. Disposed in said groove 24 is a generally U-shaped spring clip 26 which at least partially encircles the sleeve 21 at the base of the groove 24, the arms of the spring clip being normally under a tension tending to urge the same outwardly away from each other and into frictional engagement with the inner surface of the outer sleeve 10. At the base of the opposite arms of the spring clip 26, there is provided a lug or offset 27, which may be formed by pressing together the material of which the spring clip is formed, as clearly shown in Figure 5. This lug or offset 27 is disposed in the slot 18 formed between the opposite walls 17, 17 which extend between the outer sleeve 16 of the telescope and the auxiliary sleeve 14, sufficient clearance between the lug 27 and the walls 17, 17 being provided to permit the lug to freely move along the slot 18 as the inner sleeve 21 is axially adjusted relative to the outer sleeve 10. As clearly shown in Figures 3 and 4, the lug or offset 27 projects substantially to the supporting pin 15 so that when the inner sleeve 21 of the telescope is displaced outwardly or rearwardly from the outer sleeve 10, the lug or offset 27 will ultimately strike against the head 20 of the screw 19 and thereby prevent further displacement of the inner sleeve 21.

By removing the screw 19 from the end of the supporting pin 15, the inner telescope sleeve 21 may be completely displaced from the outer sleeve 10 by reason of the fact that the rear or proximal end of the slot 18 is open when the screw 19 has been removed, permitting the lug or offset 27 to pass through the end of the slot. In assembling the telescope, the arms of the spring clip 26 are disposed in the annular groove 24 and urged towards each other while held in the groove 24, so that the same may be passed into the outer sleeve 10 as the inner sleeve 21 is inserted into the outer sleeve, the lug or offset 27 being, of course, initially registered with the open end of the slot 18 at the rear or proximal end of the outer sleeve. When the inner sleeve 21 has thus been inserted far enough to carry the spring clip 26 into the outer sleeve 10, the supporting pin 15 may be inserted in the socket defined by the auxiliary sleeve 14, and the screw 19 may then be applied to the supporting pin 15 and tightened firmly against the end of the pin to prevent displacement of the telescope from the pin and dispose the head 20 of the screw in a position for abutting engagement with the lug 27 to limit axial displacement of the inner telescope sleeve 21.

It will be obvious from the foregoing that the telescope construction is not only applicable to endoscopic instruments of the type herein referred to by way of illustration, but is also useful independently of such instruments and of more general application. The size of the telescope may be varied as desired, and the supporting pin 15 may be formed as a part of any suitable type of mounting which may also materially vary in construction as compared with the head 7 and support 3.

While the details of construction have been herein shown and described, my invention is not confined thereto, as changes and alterations may be made without departing from the spirit thereof as defined by the appended claims.

Having thus described my invention, what I claim as new and desire to secure by Letters Patent is—

1. A telescope of the class described, comprising an outer sleeve having a lens mounted at one end, an inner sleeve axially slidable in the outer sleeve and provided with lens means, said inner sleeve having an annular groove therein, and a resilient member disposed in said groove and at least partially embracing the inner sleeve, said resilient member also yieldably engaging the interior of the outer sleeve for yieldably restraining said sleeves against relative axial movement, and said resilient member having means to prevent displacement of the inner sleeve from the outer sleeve.

2. In a telescope of the class described, a support, an outer sleeve mounted on said support, an inner sleeve telescopically adjustable in said outer sleeve, lens means carried by said sleeves, and cooperating abutment means mounted respectively on the inner sleeve and support for limiting telescopic adjustment of said inner sleeve relative to the outer sleeve, the abutment means on the support lying in the path of movement of the abutment means on the inner telescopic sleeve.

3. In a telescope of the class described, an elongated support, a sleeve having a socket extending longitudinally thereof at one side of the same for receiving said support so as to permit pivotal movement of said sleeve about the longitudinal axis of said support, a second sleeve telescopically mounted within the first sleeve, lens means carried by said sleeves for focal adjustment responsive to telescopic movement of the second sleeve respecting the first sleeve, means for preventing displacement of the support from the socket aforesaid, and means on said second sleeve and coacting with the means for preventing displacement of the support from the socket, for limiting telescopic movement of the second sleeve relative to the first sleeve.

4. In a telescope of the class described, an elongated pin-like support, a pair of parallel sleeve members interconnected with each other in side-by-side relation and having an elongated slot therebetween, one of said sleeve members forming a socket for loosely receiving the pin-like support to permit pivotal adjustment of the other sleeve member about the longitudinal axis of the support, another sleeve member telescopically disposed within said other sleeve member aforesaid, lens means carried by the telescopic sleeve members, abutment means carried by said last mentioned sleeve member and disposed in the slot and free to move responsive to telescopic adjustment of said last mentioned sleeve member, and abutment means carried by said support and cooperating with the aforementioned abutment means for limiting relative telescopic movement of the telescopic sleeves.

5. A telescope as claimed in claim 4, wherein the outer sleeve and socket are formed from a continuous cylindrical tube, the walls of which are depressed inwardly towards each other to dispose the same in closely spaced parallel relation to each other and thereby define an elongated slot intermediate the outer sleeve and socket portions.

6. A telescope as defined in claim 4, wherein the abutment means carried by the support comprises a screw secured to the proximal end of the support and having a head abutting against the proximal end of the support and extending laterally across the proximal end of the slot.

7. A device as defined in claim 4, wherein the first mentioned abutment means comprises a member seated in an annular groove in the inner telescopic sleeve member and having a radially protuberant part disposed in the elongated slot.

8. A device as defined in claim 4, wherein the first mentioned abutment means comprises a generally U-shaped spring member seated in an annular groove in the inner telescopic sleeve member and having a radially protuberant part disposed in the elongated slot, with the portion of the spring member lying in the annular groove aforesaid frictionally and yieldably engaging the outer telescopic sleeve.

HARRY E. PALMETER.